UNITED STATES PATENT OFFICE.

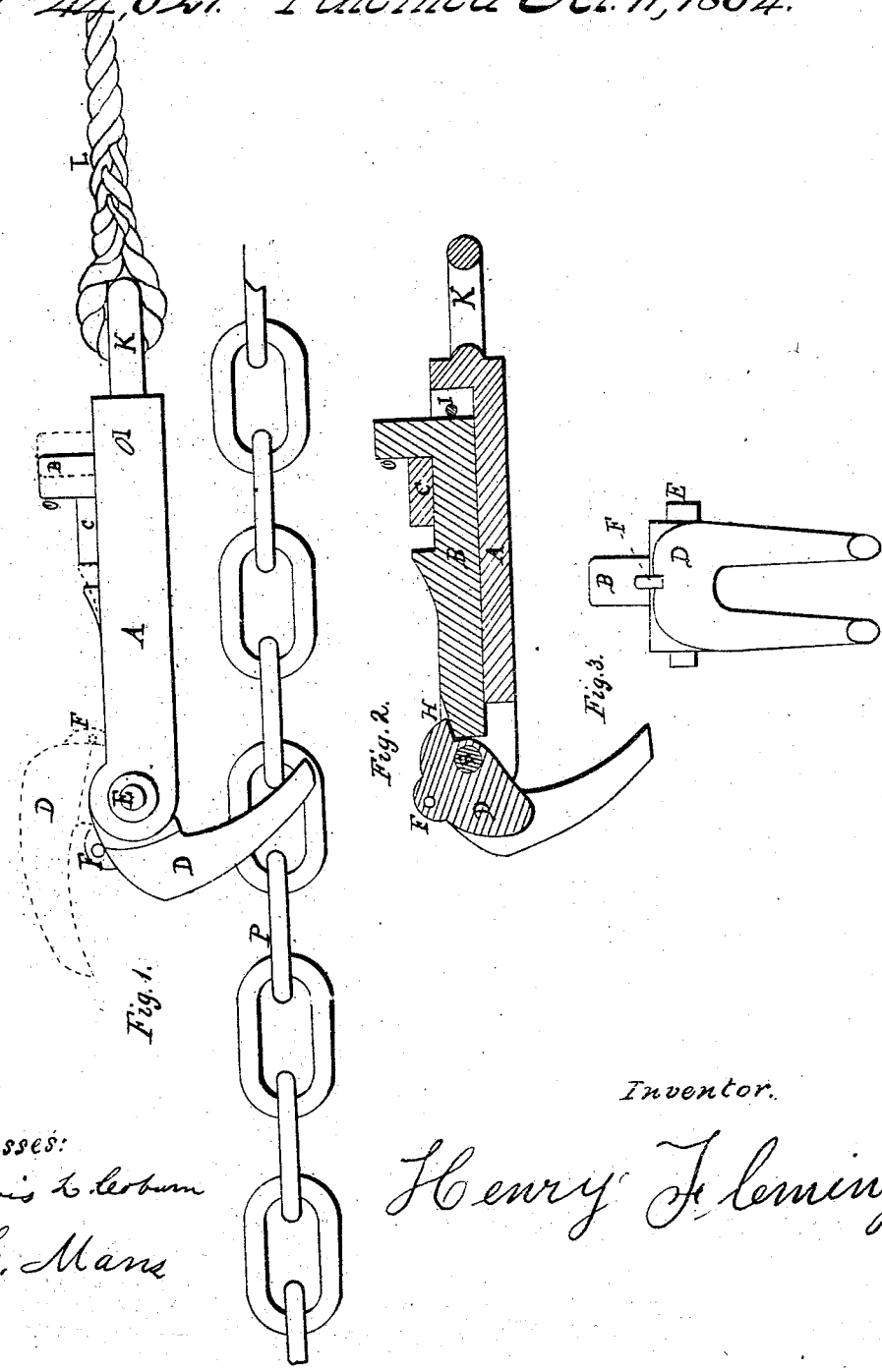

HENRY FLEMING, OF CHICAGO, ILLINOIS.

IMPROVED ANCHOR-CLUTCH.

Specification forming part of Letters Patent No. 44,621, dated October 11, 1864.

*To all whom it may concern:*

Be it known that I, HENRY FLEMING, of Chicago, in the county of Cook and State of Illinois, have invented a new and useful Anchor-Clutch; and I do hereby declare that the following is a full, clear, and exact description of the same, reference being had to the accompanying drawings and letters of reference marked thereon, which form a part of this specification, and in which—

Figure 1 represents a side elevation of my invention, showing the way in which it clutches the anchor-chain. Fig. 2 represents a vertical sectional view, and Fig. 3 an end view.

The nature of my invention consists in so constructing an anchor-grapple that it can be readily attached to the anchor-chain to hold the anchor, and by a slight blow can be made to let go of the chain when it is desired to cast anchor.

To enable those skilled in the art to manufacture and use my invention, I will proceed to describe the same with particularity.

The same letters of reference refer to the corresponding parts in the different figures.

A represents the body of the grapple, which is made with a large groove on one side, extending nearly its whole length. B is a slide which slides in said groove and is held in said groove by the cross-piece C. D are the prongs to the clutch, and turn on the pin E. When it is desired to hold the anchor by using the clutch, the prongs D are thrown down onto the anchor-chain, as in Fig. 1, and the slide B is pushed forward so that the end of it shall slide under the heel of the prongs at H. The pin I is used to keep the slide B from sliding back in case (if by accident) anything should hit it.

To let the anchor drop, the pin I is removed, and a sudden blow against the shoulder O causes the slide B to slide from under the heel of the prongs, when the weight of the anchor causes the prongs of the clutch to fly up in the position shown by the red lines in Fig. 1.

F is a hole made in the clutch for the purpose of attaching a cord, so that when the clutch is unfastened from the chain and the chain is being drawn off, the clutch can be kept from falling down under the chain and being drawn between the chain and windlass, and bent and knocked to pieces.

L is a strong rope that is attached to the clutch at the ring K, and is substantially fastened to some part of the vessel. P is the anchor-chain.

Having thus fully described my anchor-clutch, what I claim as my invention, and desire to secure by Letters Patent, is—

The bed-piece A, the slide B, and the prongs D, when arranged and operating substantially as and for the purposes set forth.

HENRY FLEMING.

Witnesses:
LEWIS L COBURN,
W. E. MARRS.